United States Patent
Augustine

(10) Patent No.: US 6,550,683 B1
(45) Date of Patent: Apr. 22, 2003

(54) HAND HELD PORTABLE DEVICE WITH MULTIPLE FUNCTIONS

(75) Inventor: Kimberly Michelle Augustine, Houston, TX (US)

(73) Assignee: Telxon Corporation, Holtsville, NY (US)

( * ) Notice: Subject to any disclaimer, the term of this patent is extended or adjusted under 35 U.S.C. 154(b) by 0 days.

(21) Appl. No.: 09/512,175

(22) Filed: Feb. 24, 2000

(51) Int. Cl.[7] .................................................. G06K 9/22
(52) U.S. Cl. ...................... 235/462.45; 705/16; 235/385
(58) Field of Search .............................. 705/16, 28, 29; 235/462.45, 462.43, 462.01, 380, 385

(56) References Cited

U.S. PATENT DOCUMENTS

| | | | | |
|---|---|---|---|---|
| 5,115,107 A | * | 5/1992 | Crooks et al. ................. | 178/18 |
| 5,373,117 A | * | 12/1994 | Crooks ......................... | 178/18 |
| 5,448,044 A | | 9/1995 | Price et al. | |
| 5,493,557 A | * | 2/1996 | Chatani ....................... | 369/124 |
| 5,533,141 A | * | 7/1996 | Futatsugi et al. ........... | 382/119 |
| 5,561,282 A | | 10/1996 | Price et al. | |
| 5,598,487 A | | 1/1997 | Hacker et al. | |
| 5,664,013 A | * | 9/1997 | Rossi .......................... | 379/428 |
| 5,889,268 A | | 3/1999 | Swartz | |
| 5,987,426 A | * | 11/1999 | Goodwin III et al. ........ | 705/16 |
| 6,050,490 A | * | 4/2000 | Leichner et al. ........ | 235/462.49 |
| 6,208,427 B1 | * | 3/2001 | Lee ........................... | 358/1.15 |
| 6,234,389 B1 | * | 5/2001 | Valliani et al. ............. | 235/380 |

FOREIGN PATENT DOCUMENTS

| | | | | |
|---|---|---|---|---|
| EP | | 338568 A2 * | 10/1989 | ............ G07G/1/14 |

OTHER PUBLICATIONS

Intermec's New Norand 680T and 680Dm Printers Provide Simple, Reliable Functionality At n Affordable Price,, Business Wir Apr. 21, 1998.*

PR Newswire article on Cyber SIGN, Inc. Article on Bimetric Signature Verification, Nov. 1999.*
BUSINESS WIRE Article concerning Intermec's New Norand Portable Printer, Apr. 1998.*
EP 565290 A2 "A portable paperless parcel tracking . . . ", Mar. 1993.*
WO 9741499 Martinez Credit Validation for use during home delivery, Nov. 1997.*
New Scientist Article HW Wilson Company, Red, Green Blue Diodes, Jul. 2000.*
Insurance Networking "Celebrating Independence Day" by Karlin, Beth, Jul. 1999.*

* cited by examiner

Primary Examiner—Douglas Hess
Assistant Examiner—Elaine Gort
(74) Attorney, Agent, or Firm—Amin & Turocy, LLP

(57) ABSTRACT

A hand held portable device is provided that includes a signature pad for receiving a customer's signature and a carbon copy receipt printer that can print out a receipt with customer information, product information and the customer's digitized signature on both a merchant receipt and a customer receipt. The hand hold portable device can also be provided with a bar code reader and a thermal transfer bar code printer. The hand held portable device is adapted to allow a user to input product information, inventory information, customer information and accept customer signatures. The portable device allows the user to select between reading a bar code, printing a bar code label and printing a receipt containing at least one of the digitized signature received by the digitized pad and the bar code information read from the bar code label. The hand held portable device can also download data to a main computer via a communication system with a connector or a radio frequency link. Warning LED's are provided to inform the user whether a signature has been accepted or a bar code label has been properly read.

19 Claims, 8 Drawing Sheets

HAND HELD PORTABLE DEVICE WITH MULTIPLE FUNCTIONS

TECHNICAL FIELD

The present invention relates to portable devices and more particularly to a hand held portable device adapted to receive a signature on a signature pad and print a first receipt and a carbon copy receipt with the signature electronically transferred onto both receipts.

BACKGROUND OF THE INVENTION

Hand held portable electronic devices are used in a variety of applications, such as for the distribution and control of products distributed to a route or sales person. The hand held portable electronic devices can provide a route or sales person with data to the product information, cost information, customer information as well as inventory information relating to the availability of products. Recently, hand held portable devices have been made available that capture a signature of the customer and can store the signature in digitized form and in some cases verify the signature with a previously recorded signature. Typically, the digitized signatures are downloaded to a main computer system at a later time for storing and providing a record of the digitized signatures. However, in some cases the route or sales person may drop the hand held portable device or the device can become damaged during transport causing the device to lose the digitized signatures resulting in loss of record of the transaction. An effort has been made to solve this problem by providing a receipt with a space for the customer to sign and placing the receipt over the digitized pad, so that a signature receipt can be provided simultaneously with the capturing of the digitized signature. This method is cumbersome for the route or sales person and if the customer loses this receipt, the receipt with the signature cannot be reproduced.

Accordingly, there is a strong need in the art for a hand held portable device that overcomes the aforementioned problems.

SUMMARY OF THE INVENTION

According to one aspect of the present invention, a hand held portable device is provided that includes a signature pad for receiving a customer's signature and a carbon copy receipt printer that can print out a receipt with customer information, product information and the customer's digitized signature on both a merchant receipt and a customer receipt. The hand hold portable device can also be provided with a bar code reader and a thermal transfer bar code printer. The hand held portable device is adapted to allow a user to input product information, inventory information, customer information and accept customer signatures. The portable device allows the user to select between reading a bar code, printing a bar code label and printing a receipt containing at least one of the digitized signature received by the digitized pad and the bar code information read from the bar code label. The hand held portable device can also download data to a main computer via a communication system with a connector or a radio frequency link. Warning LED's are provided to inform the user whether a signature has been accepted or a bar code label has been properly read.

In accordance with one aspect of the present invention, a hand held portable device is provided. The hand held portable device includes a signature pad adapted to receive and digitize a signature written on the signature pad and a receipt printer adapted to output a receipt with the digitized signature contained thereon.

In accordance with yet another aspect of the present invention, a method of performing a sales transaction is provided. The method includes the steps of providing a hand held data terminal with a signature pad and a receipt printer, writing a signature on the signature pad, digitizing the signature and storing the digitized signature in a memory, outputting the digitized signature to the receipt printer and printing a receipt with the digitized signature thereon.

In accordance with another aspect of the present invention, a hand held portable device is provided. The hand held portable device includes a signature pad adapted to receive and digitize a signature written on the signature pad, a bar code reader adapted to read a bar code label, a receipt printer adapted to output a receipt with at least one of the digitized signature contained thereon and bar code data corresponding to information read from the bar code by the bar code reader, an input device adapted to allow a user to input product information and a bar code printer adapted to print a bar code label containing the product information inputted by the user.

In accordance with yet another aspect of the present invention, a hand held portable device is provided. The hand held portable device includes means for digitizing a signature written on a signature pad and means for printing a receipt with the digitized signature contained thereon.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts.

Figure 1:
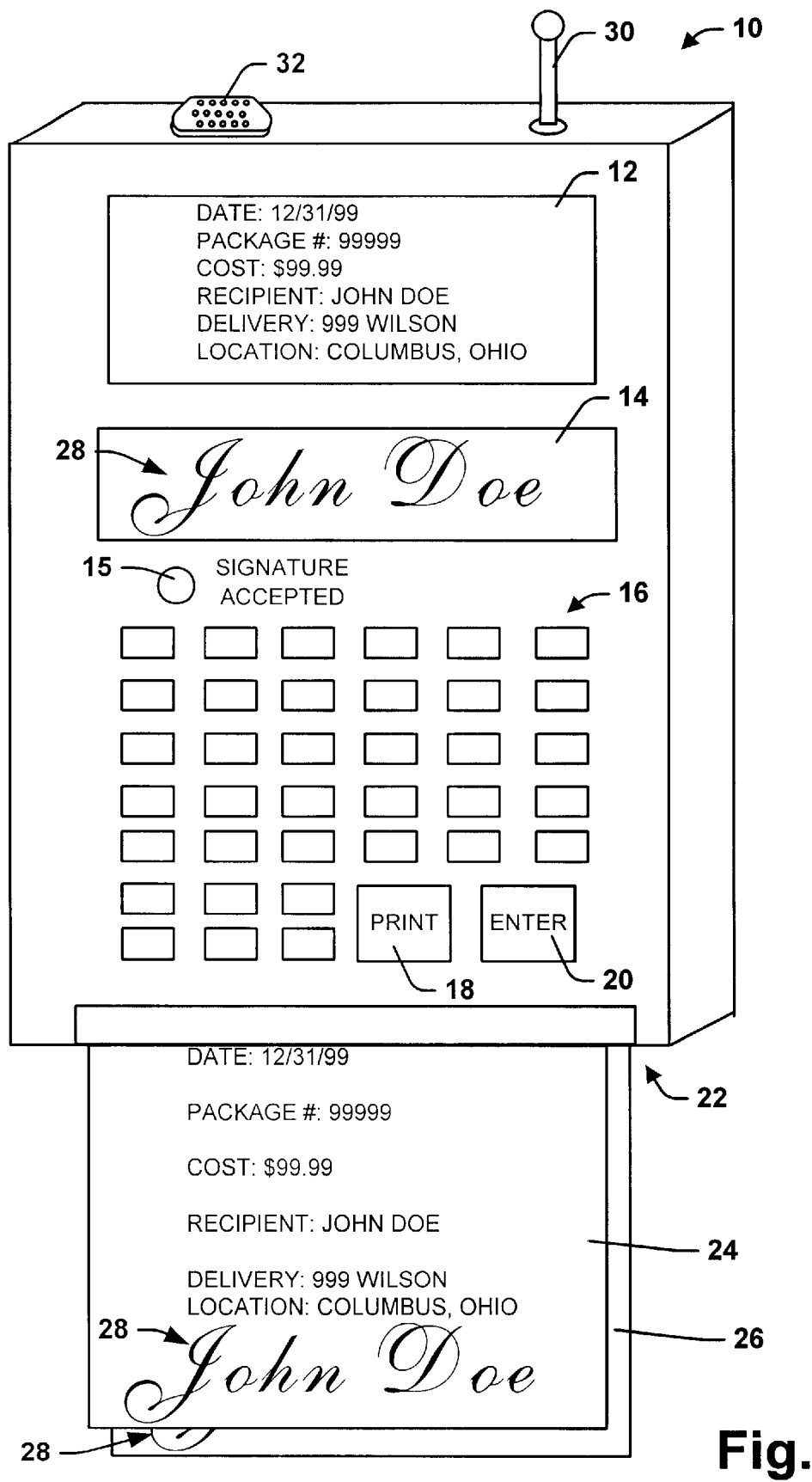
FIG. 1 illustrates a perspective view of a hand held portable device in accordance with one aspect of the present invention.

Referring initially to FIG. 1, a hand held portable device 10 is provided with a signature pad 14 and a carbon copy receipt printer 22. The signature pad 14 could be of any suitable type for recording handwritten data, such as an optical scanner (not shown). Optical scanners are available for reading handwritten data of all types and for processing the information read digitally and entering the digitized data into a memory of a computer for analysis, storage or for later transferring to a main computer. Alternatively, the signature pad 14 may be a digitized pad of any suitable type responsive to operating pressures in a suitable range like that applied by a signature utilizing a ball point pen. The signature pad 14 captures a customer's signature 28 and prints out a receipt 24 in addition to a carbon copy receipt 26 from the carbon copy receipt printer 22. This provides both a merchant copy and a customer copy of the transaction including the customer's signature 28, so that any subsequent damage to the hand held portable device 10 does not eliminate completely a record of the transaction. The receipt can include a variety of other product or customer related information depending on the specific application.

The hand held portable device 10 includes a display 12 for displaying to an operator information relating to the operation of the hand held portable device 10. The hand held device 10 further includes an operator input device 16 in the form of a key pad which enables a user to enter data, information, function commands, etc. For example, the user may input information relating to product information and/or customer information via the keypad 16 for subsequent transmission to a main computer through antenna 30. Transmission of the information to the main computer would again ensure that damage to the portable device 10 would not cause the complete loss of any record of the transaction. In addition, the keypad 16 may include up and down cursor keys for controlling a cursor which may be shown on the display 12. The key pad 16 may also include a print key 18 for subsequent printing of the receipt 24 and the carbon copy receipt 26 containing the signature 28. The key pad 16 can also include an enter key 20 for entering customer or product information relating to the transaction.

The hand held portable device 10 includes a tri-state LED 15 for informing the user whether or not a valid signature 28 has been accepted by the hand held portable device 10. The hand held portable device 10 includes a fifteen pin communications port 32 for interfacing the diagnostic device 10 with a main computer (not shown) via a conventional communications link. It is to be appreciated that a variety of different types of connectors could be used, such as a nine pin connector or a telephone connector. According to a preferred aspect of the present invention, the hand held portable device 10 is part of a communication system including a network backbone (not shown). The network backbone may be a hardwired data communication path made of twisted pair cable, shielded coaxial cable or fiber optic cable, for example, or may be wireless or partially wireless in nature. Information can be transmitted via the network backbone between the diagnostic device 10 and the main computer which are coupled to the network backbone. The communication link preferably adheres to the RS232C standard for communicating command and parameter information. However, any communication link or network link such is suitable for carrying out the present invention may be employed.

Figure 2:
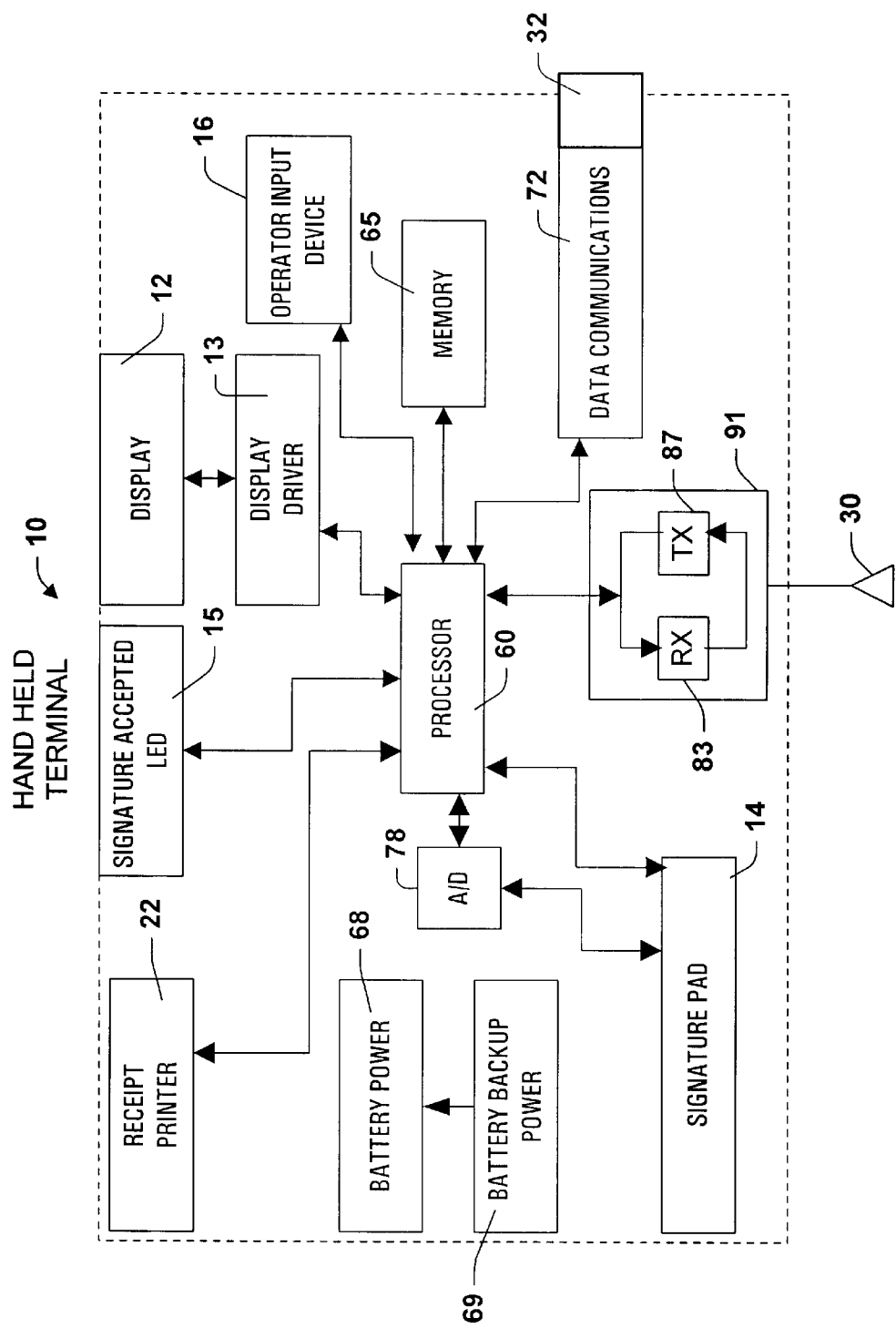
FIG. 2 is a functional schematic diagram of the hand held portable device of FIG. 1 in accordance with the present invention.

Referring now to FIG. 2, a schematic representation of the present invention is shown according to one particular aspect of the present invention, wherein a processor 60 is responsible for controlling the general operation of the hand held portable device 10. The processor 60 is programmed to control and operate the various components within the hand held portable device 10 in order to carry out the various functions described herein. The processor or CPU 60 can be any of a plurality of processors, such as the p24T, Pentium 50/75, Pentium 60/90, and Pentium 66/100, Pentium PRO and Pentium 2, and other similar and compatible processors or micro controllers. A processor such as Intel's 8 bit microcontrollers, the 8031, 8051 or 8052 can be utilized. The manner in which the processor 60 can be programmed to carry out the functions relating to the present invention will be readily apparent to those having ordinary skill in the art based on the description provided herein.

A memory 65 tied to the processor 60 is also included in the hand held portable device 10 and serves to store program code executed by the processor 60 for carrying out operating functions of the hand held portable device 10 as described herein. The memory 65 also serves as a storage medium for temporarily storing information such as receipt transaction information and the like. The memory 65 is adapted to store a complete set of the information to be displayed. According to a preferred embodiment, the memory 65 has sufficient capacity to store multiple sets of information, and the processor 60 could include a program for alternating or cycling between various sets of display information. This feature enables the display 12 to show a variety of effects conducive for quickly conveying product and customer information to a user.

The display 12 is coupled to the processor 90 via a display driver system 13. The display 12 may be a liquid crystal display (LCD) or the like. In the preferred embodiment, the display 12 is a fine pitch liquid crystal display operated as a standard CGA display with a resolution of 640×200 pixels. The display 12 functions to display data or other information relating to ordinary operation of the hand held portable device 10. For example, the display 12 may display a set of customer information which is displayed to the operator and may be transmitted over a system backbone (not shown). Additionally, the display 12 may display a variety of functions that control the execution of the hand held portable device 10. The display 12 is capable of displaying both alphanumeric and graphical characters.

Power is provided to the processor 60 and other components forming the hand held portable device 10 by a battery power module 68. The hand held portable device 10 is protected by battery power failure by a battery backup power module 69. Typically, the battery backup module 69 is a much smaller battery than the battery module 68 and invoked only during swapping of the battery module 68 or a battery module failure. Preferably, the hand held portable device 10 will enter a minimum current draw or sleep mode upon detection of the battery power module failure.

The hand held portable device 10 includes a communication subsystem 72 which includes the data communication port 32, which is employed to interface the processor 60 with the main computer. The hand held portable device also optionally includes an RF section 91 connected to the processor 60. The RF section 91 includes an RF receiver 83 which receives RF transmissions from the main computer for example via the antenna 30 and demodulates the signal to obtain digital information modulated therein. The RF section 91 also includes an RF transmitter 87 for transmitting information to the main computer, for example, in response to an operator input at keypad 16 or the completion of a transaction.

In accordance with a preferred aspect of the present invention, the battery power module drives the printer 22, the signature accepted LED 15, operator input device 16, the signature pad 14 and an (A/D) converter 78, which converts the analog signals provided by the signature pad 14 to digital form. The analog to digital converter 78 provides the processor 60 with digitally converted signals corresponding to the analog signals provided by the signature pad 14. The signature LED 15 is a tri-state LED that illuminates between red and green depending on whether or not a valid signature has been received.

Figure 3:
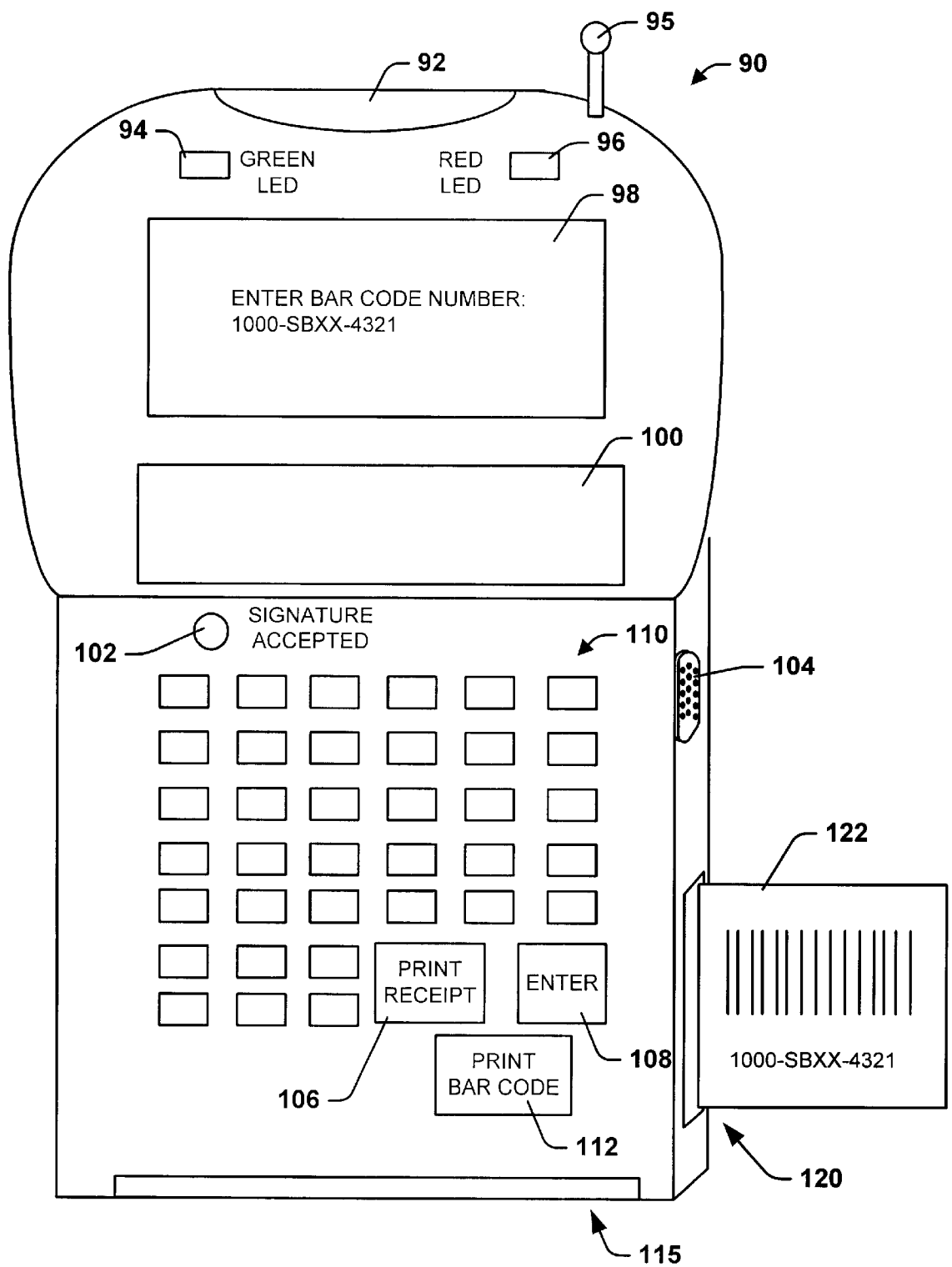
FIG. 3 illustrates a perspective view of an alternate embodiment of a hand held portable device printing a bar code label in accordance with another aspect of the present invention.

Referring now to FIG. 3, an alternate embodiment of the present invention illustrates a hand held portable device 90 with a bar code reader 92 and a thermal transfer bar code printer 120. The bar code reader 92 is adapted to read information on a bar code label or the like. The hand held portable device 90 includes a green LED 94 that is illuminated when a bar code is properly read and a red LED 96 that is illuminated when a bar code is improperly read. The hand held portable device 90 includes a display 98 for displaying to an operator information relating to the operation of the hand held portable device 90. The hand held device 90 further includes an operator input device 110 in the form of a key pad which enables a user to enter data, information, function commands, etc. For example, the user may input information relating to product information for inputting a bar code number via the keypad 110 for subsequent printing of a bar code label 122. The key pad 110 may also include a print bar code key 112 for activation of printing of the bar code label 122. The key pad 110 can also include an enter key 108 for entering customer or product information relating to transaction or bar code information. The key pad 110 may further include an print receipt key 106 for printing a receipt from the receipt printer 115.

The hand held portable device 90 is provided with a signature pad 100. The signature pad 100 captures a customer's signature and prints out a receipt from the receipt printer 115. The receipt can include a variety of other product or customer related information depending on the specific application. The hand held portable device 90 includes a tri-state LED 102 for informing the user whether or not a valid signature has been accepted by the hand held portable device 90. The hand held portable device 90 includes a fifteen pin communications port 104 for interfacing the hand held portable device 90 with a main computer (not shown) via a conventional communications link. Alternatively, the hand held portable device 90 can communicate with the main computer through an RF device via antenna 95.

Figure 4:
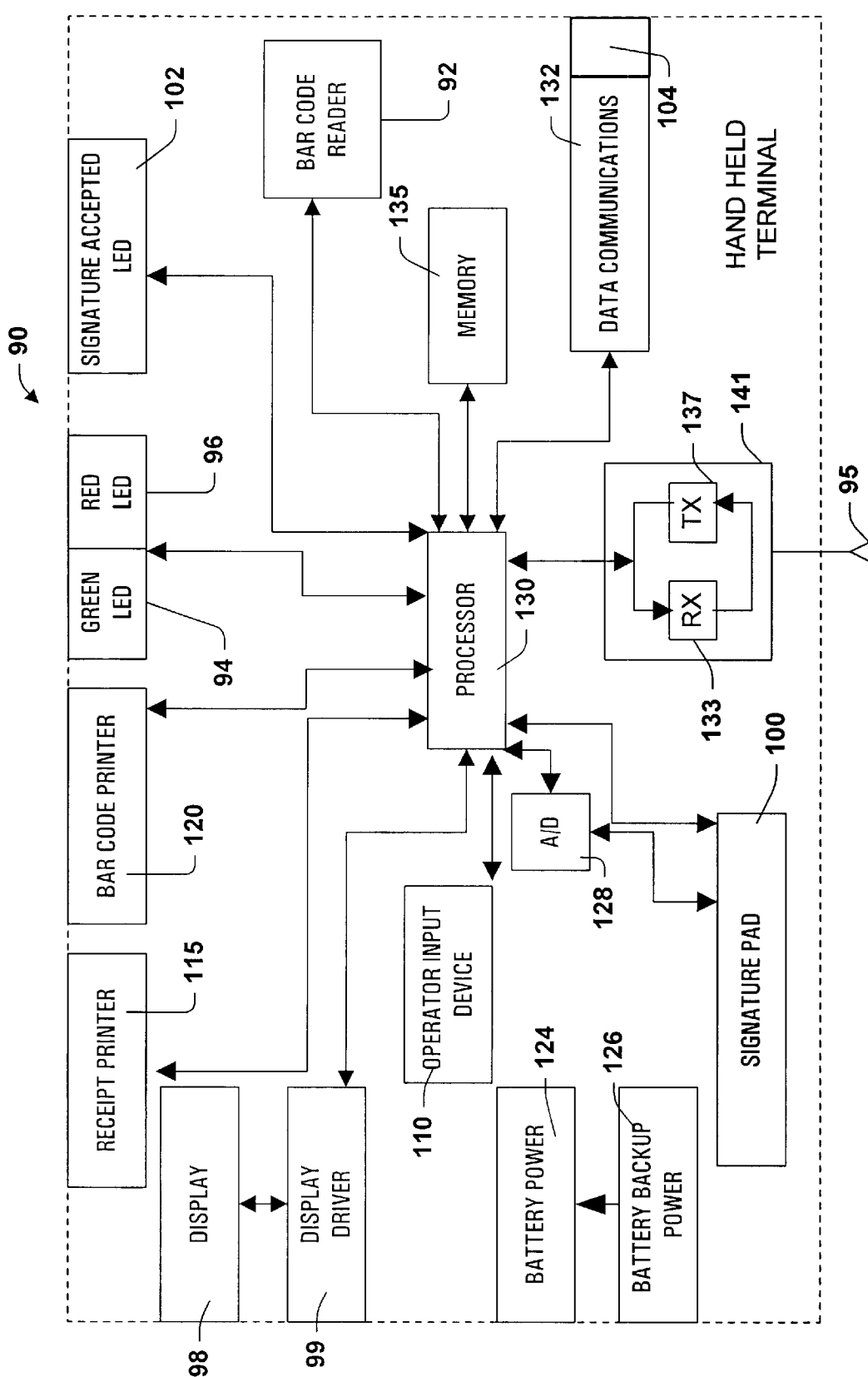
FIG. 4 is a functional schematic diagram of the hand held portable device of FIG. 3 in accordance with the present invention.

Referring now to FIG. 4, a schematic representation of the present invention is shown according to one particular aspect of the present invention, wherein a processor 130 is responsible for controlling the general operation of the hand held portable device 90. The processor 130 is programmed to control and operate the various components within the hand held portable device 90 in order to carry out the various functions described herein. The memory 135 includes read only memory (ROM) and random access memory (RAM).

The ROM contains among other code the Basic Input-Output System (BIOS) which controls the basic hardware operations of the hand held portable device 90. The RAM is the main memory into which the application programs are loaded and sampled data is stored. A display 98 is coupled to the processor 90 via a display driver system 99. The display 98 may be a liquid crystal display (LCD) or the like.

Power is provided to the processor 90 and other components forming the hand held portable device 10 by a battery power module 124. The hand held portable device 90 is protected by battery power failure by a battery backup power module 126. Typically, the battery backup module 126 is a much smaller battery than the battery module 124 and invoked only during swapping of the battery module 124 or a battery module failure. Preferably, the hand held portable device 90 will enter a minimum current draw or sleep mode upon detection of the battery power module failure.

The hand held portable device 90 includes a communication subsystem 132 which includes the data communication port 104, which is employed to interface the processor 90 with the main computer. The hand held portable device 90 also optionally includes an RF section 141 connected to the processor 90. The RF section 141 includes an RF receiver 133 which receives RF transmissions from the main computer for example via the antenna 95 and demodulates the signal to obtain digital information modulated therein. The RF section 141 also includes an RF transmitter 137 for transmitting information to the main computer, for example, in response to an operator input at keypad 110 or the completion of a transaction.

Figure 5:
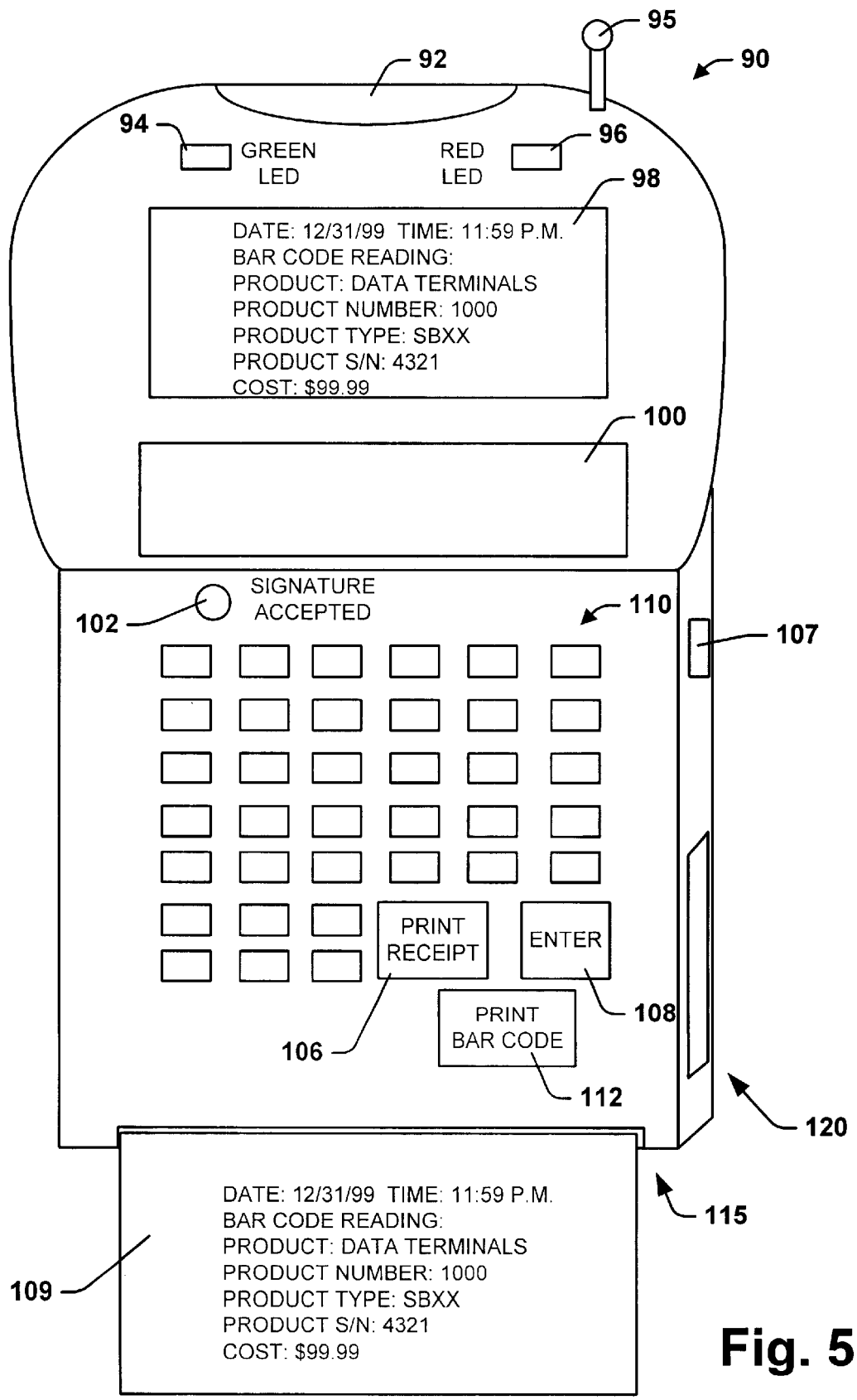
FIG. 5 illustrates a perspective view of the alternate embodiment of the hand held portable device of FIG. 3 printing a bar code receipt in accordance with another aspect of the present invention.

In accordance with a preferred aspect of the present invention, the battery power module drives the operator input device 110, the receipt printer 115, the bar code printer 120, the bar code reader 92, the green LED 94, the red LED 96, the signature accepted LED 102, the signature pad 100 and an (A/D) converter 128, which converts the analog signals provided by the signature pad 100 to digital form. The operation of each of the aforementioned units are controlled by the processor 130. The analog to digital converter 128 provides the processor 130 with digitally converted signals corresponding to the analog signals provided by the signature pad 100. The signature LED 102 is a tri-state LED that illuminates between red and green depending on the receipt of a valid signature. FIG. 5 illustrates utilizing the bar code reader device in conjunction with the receipt printer 115 in which like numbered elements represent like parts. The user reads in the bar code off a product label and the processor retrieves additional information related to the product and displays this information on the display 98. The display 98 can also display the bar code label read, which can be combined with product and/or customer information provide by the user that can be printed on a receipt 109 from the receipt printer 115. In the example shown, the information on the receipt 109 is the date, product, product number, product type, product serial number and the cost of the product. It is to be appreciated that any number of configurations of information can be provide on receipt 109. FIG. 5 also illustrates an alternate communication connector in the form of a conventional telephone connector 107 for connecting to the main computer. It is to be appreciated that the battery power 124 can be a rechargeable battery and be charged by a conventional lithium charger cradle system (not shown) during nonuse.

Figure 6:
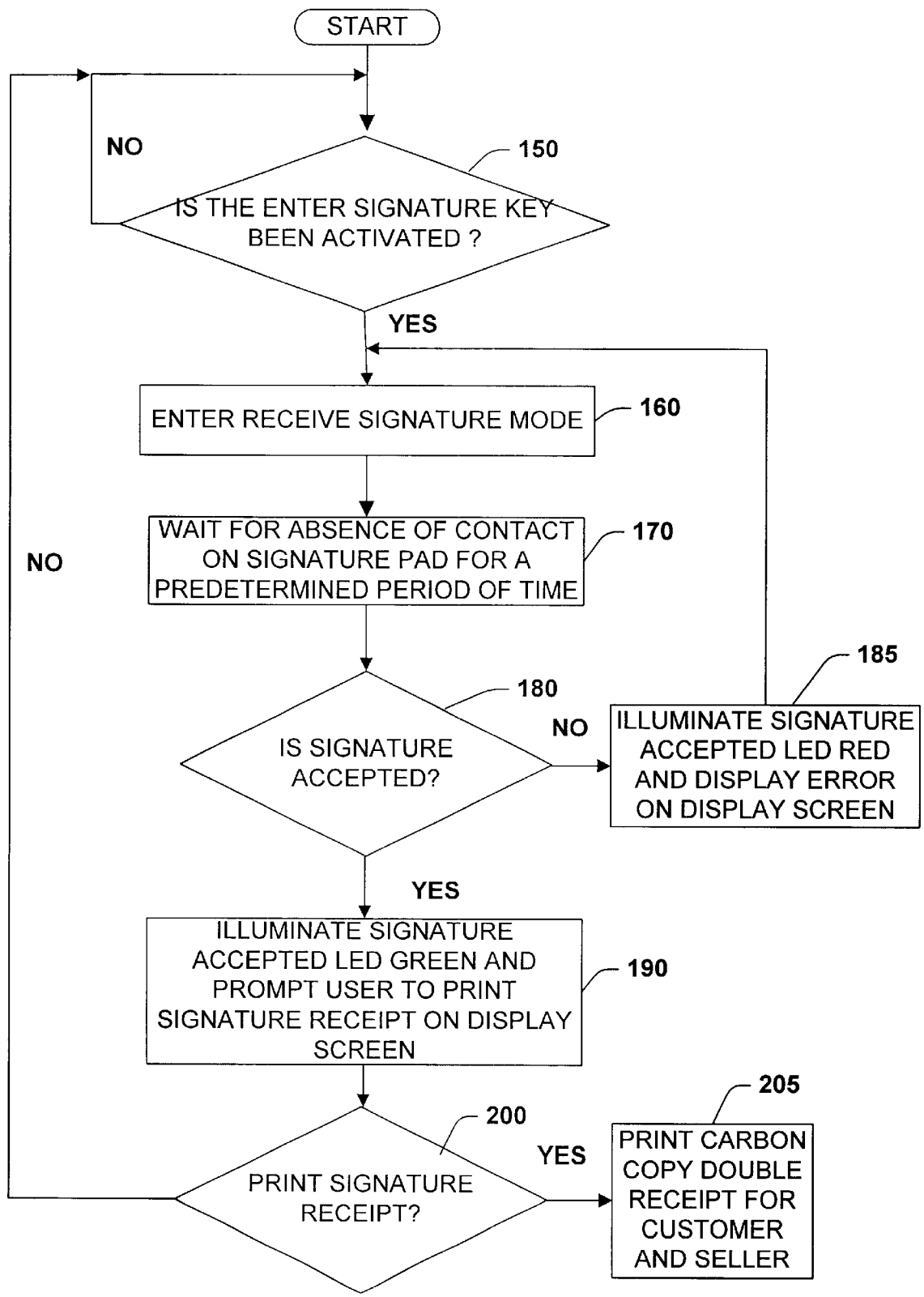
FIG. 6 illustrates a flow diagram for receiving and digitizing a signature and printing out a receipt with the signature thereon in accordance with the present invention.

FIG. 6 illustrates the steps taken by the present invention to capture a signature and print a receipt for the merchant and the customer with the digitized signature printed thereon. Beginning in step 150, the processor 60 monitors the enter signature key for digitizing a customer's signature. This may be accomplished by depressing a preprogrammed function key or by depressing the enter key 20. If the key has not been depressed the processor 60 continues monitoring the enter signature key. If the key is depressed, the processor 60 enters the receive signature mode in step 160. In step 170, the processor begins reading the signature pad 14 upon sensing contact with the signature pad 14 and waiting for absence of contact on the signature pad 14 for a predetermined period of time. In step 180, the processor 60 determines if the signature was accepted based on a signature acceptable algorithm. If the signature is not acceptable, the processor 60 illuminates the signature accepted LED 15 red to inform the operator that the signature was unacceptable, and displays an error on the display screen 12 in step 185. The processor 60 then returns to step 160. If the signature is acceptable, the processor 60 illuminates the signature accepted LED 15 green to inform the operator that the signature is acceptable and prompts the user to print the signature receipt on the display screen 12 in step 190. In step 200, the processor monitors the print key 18 for depression. If the key 18 is depressed, the receipt printer 22 prints a carbon copy double receipt for the customer and the merchant with the customer's signature thereon.

Figure 7:
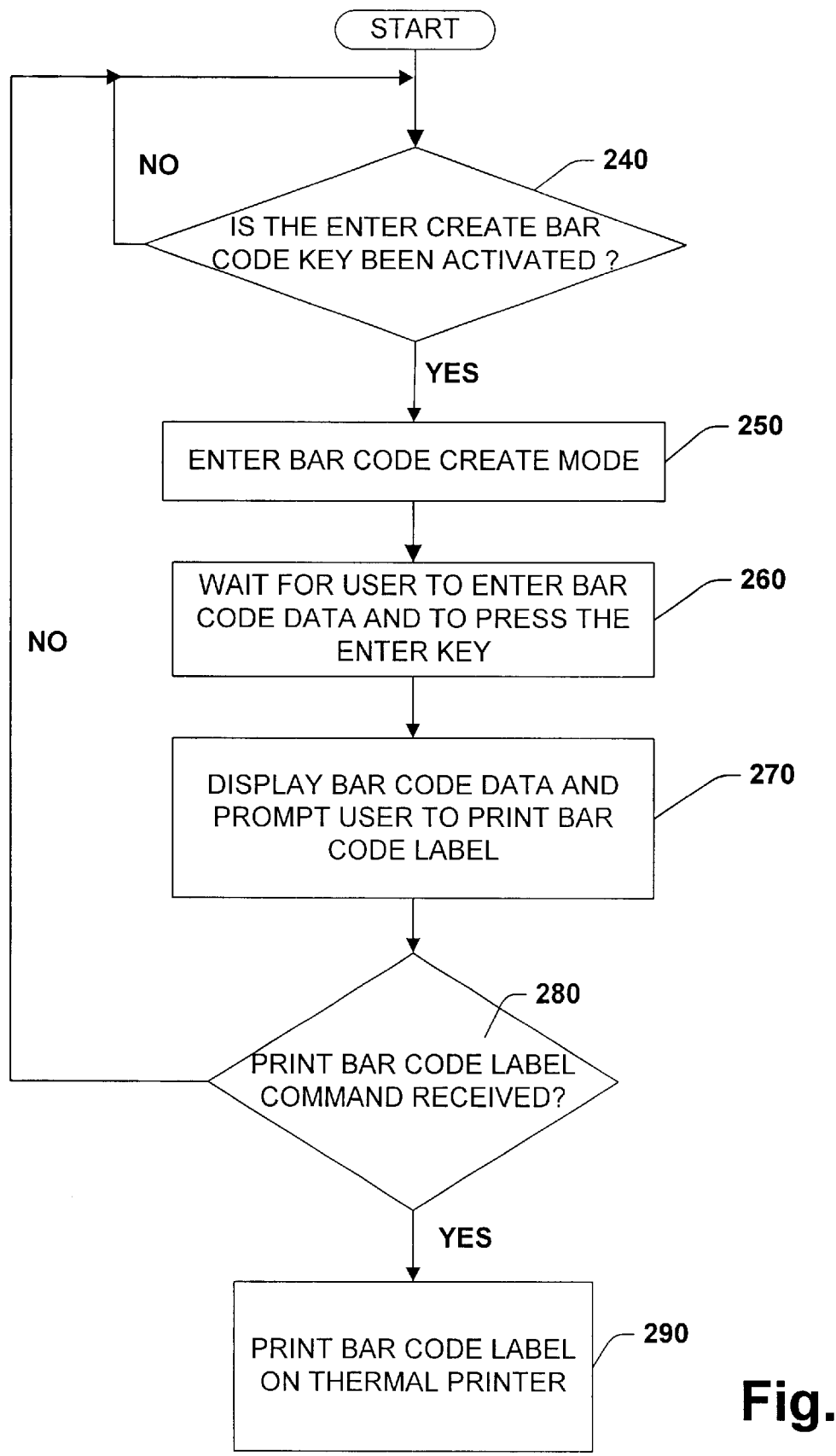
FIG. 7 illustrates a flow diagram for creating and printing out a bar code label in accordance with the present invention.

FIG. 7 illustrates the steps taken by the present invention to create a bar code label. Beginning in step 240, the processor 130 monitors whether the enter create bar code key has been depressed. This may be accomplished by depressing a preprogrammed function key. If the key has not been depressed, the processor 130 continues monitoring the enter create bar code key. If the key is depressed, the processor 130 enters the create bar code mode in step 250. In step 260, the processor 130 waits for the user to enter bar code data and to press the enter key 108. In step 270, the processor 130 displays the bar code data on the display and prompts the user to print the bar code label. In step 280, the processor 130 monitors the print bar code key 112 for depression. If the key 112 is depressed, the bar code label is printed from the bar code printer 120. If the key 112 is not depressed for a predetermined period of time, the processor 130 returns to step 240.

Figure 8:
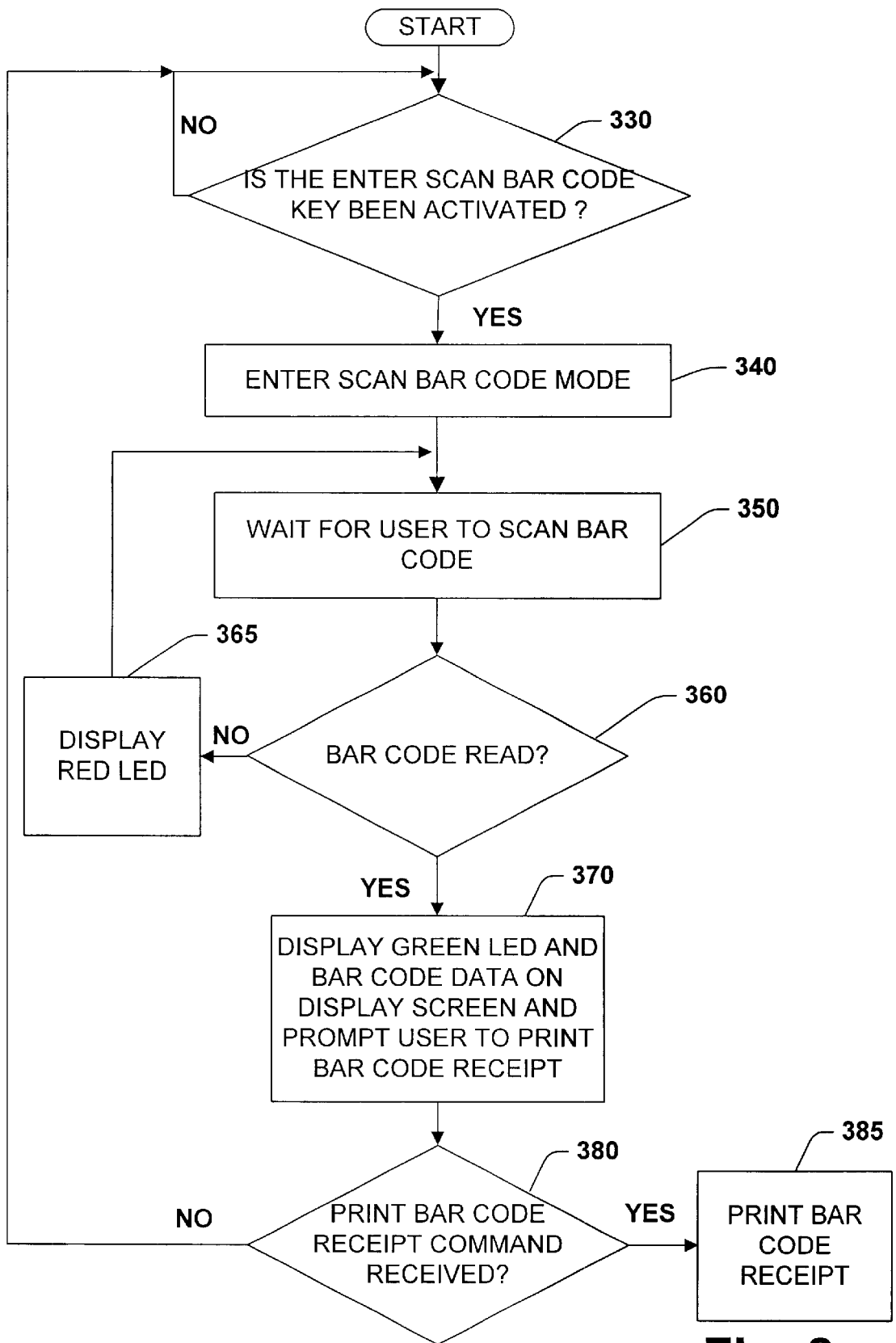
FIG. 8 illustrates a flow diagram for reading a bar code label and printing out a bar code receipt in accordance with the present invention.

FIG. 8 illustrates the steps taken by the present invention to scan a bar code label. Beginning in step 330, the processor 130 monitors the enter scan bar code key for activation. This may be accomplished by depressing a preprogrammed function key. If the key has not been depressed, the processor 130 continues monitoring the scan bar code key. If the key is depressed, the processor 130 enters the scan bar code mode in step 340. In step 350, the processor 130 waits for the user to scan a bar code. In step 360, the processor 130 determines if the bar code has been read properly. If the bar code has not been read properly, the processor 130 illuminates the red LED 96 in step 365 and returns to step 350. If a bar code has been properly read, the processor 130 displays the green LED 94, displays the bar code data on the display 98 and prompts the user to print the bar code receipt. In an alternate aspect of the invention, the user can add data to the receipt or the processor can add data to the receipt. In step 380, the processor 130 monitors the print receipt key 106. If the print receipt key 106 is depressed, the bar code label receipt is printed from the receipt printer 115 in step 385. If the key 106 is not depressed for a predetermined period of time, the processor 130 returns to step 330.

The invention has been described with reference to the preferred embodiments. Obviously, modifications and alterations will occur to others upon reading and understanding the preceding detailed description. It is intended that the invention be construed as including all such modifications alterations, and equivalents thereof.

What is claimed is:

1. A hand held portable device, comprising:
    a signature pad adapted to receive and digitize a signature written on the signature pad;
    a bar code reader adapted to read a bar code label;
    a receipt printer adapted to output a receipt with at least one of the digitized signature contained thereon and bar code data corresponding to information read from the bar code by the bar code reader;
    an input device adapted to allow a user to input product information; and
    a bar code printer adapted to print a bar code label containing the product information inputted by the user;
    where the portable device allows the user to select between reading a bar code, printing a bar code label and printing a receipt containing at least one of the digitized signature received by the signature pad and the bar code information read from the bar code label.

2. The device of claim 1, the printer being a carbon copy printer adapted to output a first receipt with the digitized signature thereon and a carbon copy receipt with the digitized signature thereon.

3. The device of claim 1, the receipt further including at least one of customer and product data.

4. The device of claim 3, the at least one of customer and product data being stored in a memory of the hand held portable device.

5. The device of claim 3, the at least one of customer and product data being entered by a user through a key pad of the hand held portable device.

6. The device of claim 1, further including a processor operatively coupled to the signature pad and the receipt printer, the processor digitizing signatures written on the signature pad and outputting the digitized signature to the receipt outputted by the receipt printer.

7. The device of claim 6, further including a tri-state LED operatively coupled to the processor, the processor illuminating the tri-state LED green if a signature written on the signature pad is acceptable and illuminating the tri-state LED red if a signature written on the signature pad is not acceptable.

8. The device of claim 1, the signature pad utilizing optical sensors.

9. The device of claim 1, the signature pad being a digitized pad.

10. The device of claim 1, further including a display to display information relating to the operation of the hand held portable device.

11. The device of claim 1, further including a communication subsystem to download data to a main computer through a communication port.

12. The device of claim 1, further including a radio frequency communication subsystem to download data to a main computer and receive data through a communication port through a radio frequency link.

13. The device of claim 1, the bar code printer being a thermal transfer printer.

14. A hand held portable device, comprising:
    a signature pad adapted to receive and digitize a signature written on the signature pad;
    a bar code reader adapted to read a bar code label;
    a receipt printer adapted to output a receipt with at least one of the digitized signature contained thereon and bar code data corresponding to information read from the bar code by the bar code reader;

an input device adapted to allow a user to input product information;

a bar code printer adapted to print a bar code label containing the product information inputted by the user; and a processor operatively coupled to the signature pad, the receipt printer, the bar code reader and the bar code printer, the processor adapted to digitize signatures written on the signature pad and output the digitized signature to the receipt outputted by the receipt printer, the processor further adapted to receive bar code information from the bar code reader and output the bar code information to the receipt outputted by the receipt printer and also adapted to receive bar code data from a key pad and output that data to a bar code printed by the bar code printer.

15. The device of claim 14, further including a tri-state LED operatively coupled to the processor wherein the processor illuminates the tri-state LED green if a signature written on the signature pad is acceptable and illuminates the tri-state LED red if a signature written on the signature pad is not acceptable.

16. The device of claim 15, further including a green LED and a red LED both operatively coupled to the processor wherein the processor illuminates green LED if a bar code is properly read by the bar code reader and illuminates the red LED if a bar code is not properly read by the bar code reader.

17. The device of claim 16, further including a display adapted to display information relating to the operation of the hand held portable device.

18. The device of claim 17, further including a communication subsystem adapted to download data to a main computer through a communication port.

19. The device of claim 18, further including a radio frequency communication subsystem adapted to download data to a main computer and receive data through a communication port through a radio frequency link.

* * * * *